US012572698B2

(12) United States Patent
Schappaugh et al.

(10) Patent No.: US 12,572,698 B2
(45) Date of Patent: Mar. 10, 2026

(54) INFRASTRUCTURE METHODS AND SYSTEMS FOR EXTENDING CUSTOMER RELATIONSHIP MANAGEMENT PLATFORM

(71) Applicant: STATE FARM MUTUAL AUTOMOBILE INSURANCE COMPANY, Bloomington, IL (US)

(72) Inventors: Benjamin Schappaugh, Bloomington, IL (US); John Thompson, Bloomington, IL (US); Frank Matthew McCully, Hudson, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 629 days.

(21) Appl. No.: 16/411,574

(22) Filed: May 14, 2019

(65) Prior Publication Data

US 2025/0173464 A1 May 29, 2025

Related U.S. Application Data

(60) Provisional application No. 62/671,172, filed on May 14, 2018.

(51) Int. Cl.
*G06F 21/62* (2013.01)
*G06F 16/958* (2019.01)
*G06Q 30/016* (2023.01)

(52) U.S. Cl.
CPC .......... *G06F 21/629* (2013.01); *G06F 16/958* (2019.01); *G06F 21/6245* (2013.01); *G06Q 30/016* (2013.01)

(58) Field of Classification Search
CPC .. G06F 21/629; G06F 16/958; G06F 21/6245; G06Q 30/016
USPC .......................................................... 726/27
See application file for complete search history.

(56) References Cited

U.S. PATENT DOCUMENTS

| | | | | |
|---|---|---|---|---|
| 7,107,543 | B2 * | 9/2006 | Berry | H04L 67/75 |
| | | | | 715/744 |
| 2004/0216134 | A1 * | 10/2004 | Hammerich | G06F 9/542 |
| | | | | 719/318 |
| 2014/0172740 | A1 * | 6/2014 | McCormick | G06Q 30/0281 |
| | | | | 705/342 |
| 2014/0173130 | A1 * | 6/2014 | Uluderya | G06F 9/5055 |
| | | | | 709/238 |

(Continued)

FOREIGN PATENT DOCUMENTS

| | | | | |
|---|---|---|---|---|
| WO | WO-2010037858 A1 * | 4/2010 | | G06Q 40/08 |

*Primary Examiner* — Stephen S Hong
*Assistant Examiner* — Tionna M Burke
(74) *Attorney, Agent, or Firm* — MARSHALL, GERSTEIN & BORUN LLP

(57) ABSTRACT

Systems and methods are disclosed with respect to extending customer relationship management platform, in particular, providing purpose made components to provide desired functionality. Embodiments are disclosed herein for translation multi-category data requests into single category requests; blocking or controlling browser operation; implementing security access and control over customer data requests; and file management functionality. The systems and methods may be implemented in a user system to extend the functionality of a customer relationship management platform.

18 Claims, 9 Drawing Sheets

(56)     References Cited

U.S. PATENT DOCUMENTS

| | | | |
|---|---|---|---|
| 2015/0221041 A1* | 8/2015 | Hanson ................. | G06Q 40/08 |
| | | | 705/4 |
| 2016/0217530 A1* | 7/2016 | Hashim ................. | G06Q 40/08 |

* cited by examiner

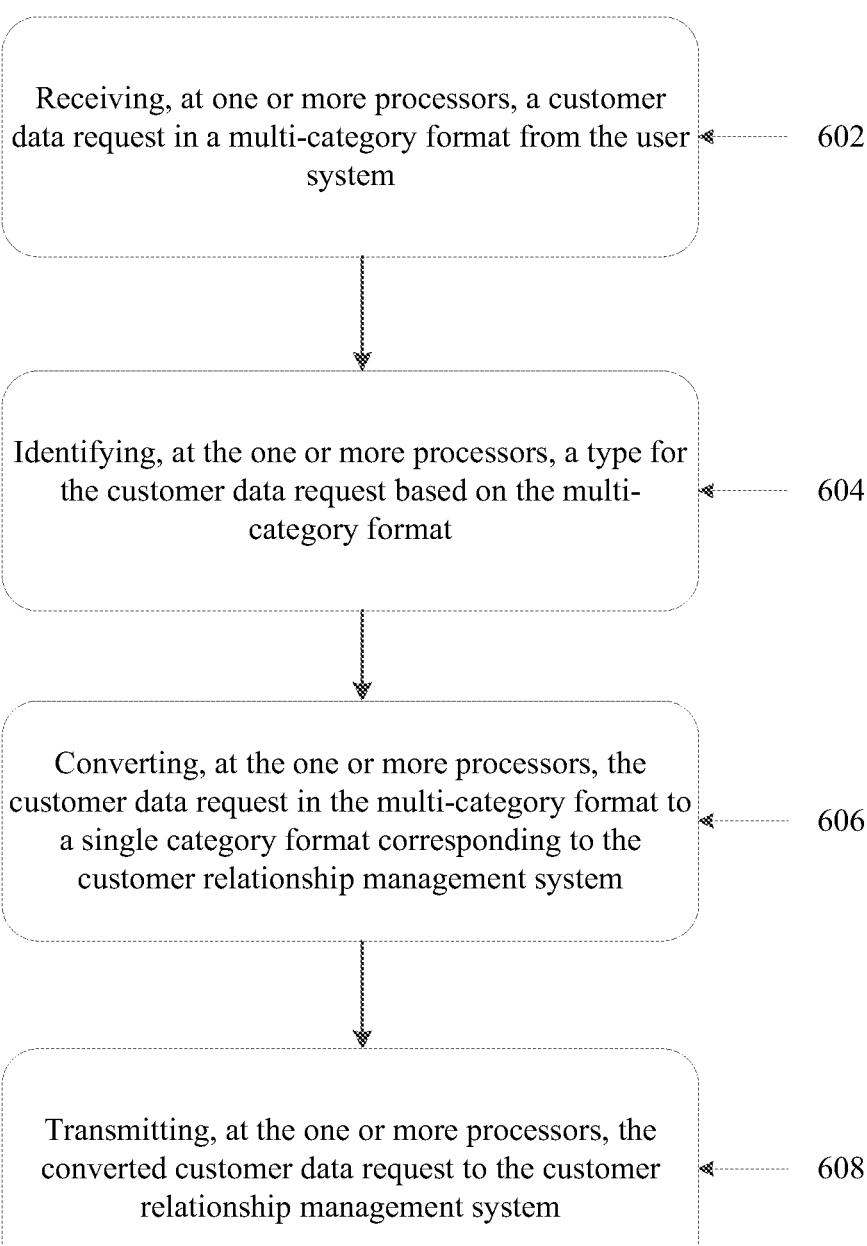

600

Receiving, at one or more processors, a customer data request in a multi-category format from the user system ◄------- 602

Identifying, at the one or more processors, a type for the customer data request based on the multi-category format ◄------- 604

Converting, at the one or more processors, the customer data request in the multi-category format to a single category format corresponding to the customer relationship management system ◄------- 606

Transmitting, at the one or more processors, the converted customer data request to the customer relationship management system ◄------- 608

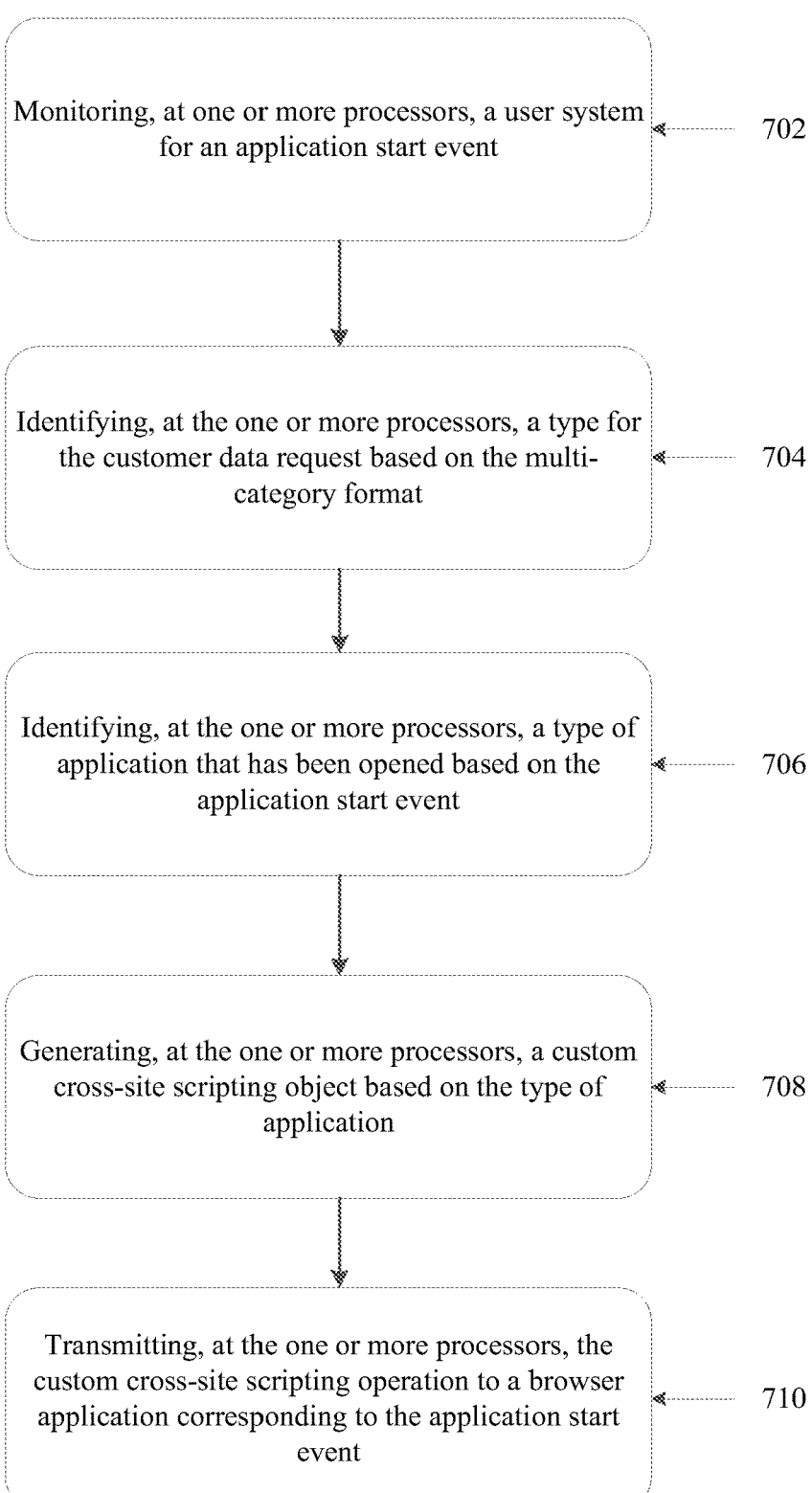

Monitoring, at one or more processors, a user system for an application start event — 702

Identifying, at the one or more processors, a type for the customer data request based on the multi-category format — 704

Identifying, at the one or more processors, a type of application that has been opened based on the application start event — 706

Generating, at the one or more processors, a custom cross-site scripting object based on the type of application — 708

Transmitting, at the one or more processors, the custom cross-site scripting operation to a browser application corresponding to the application start event — 710

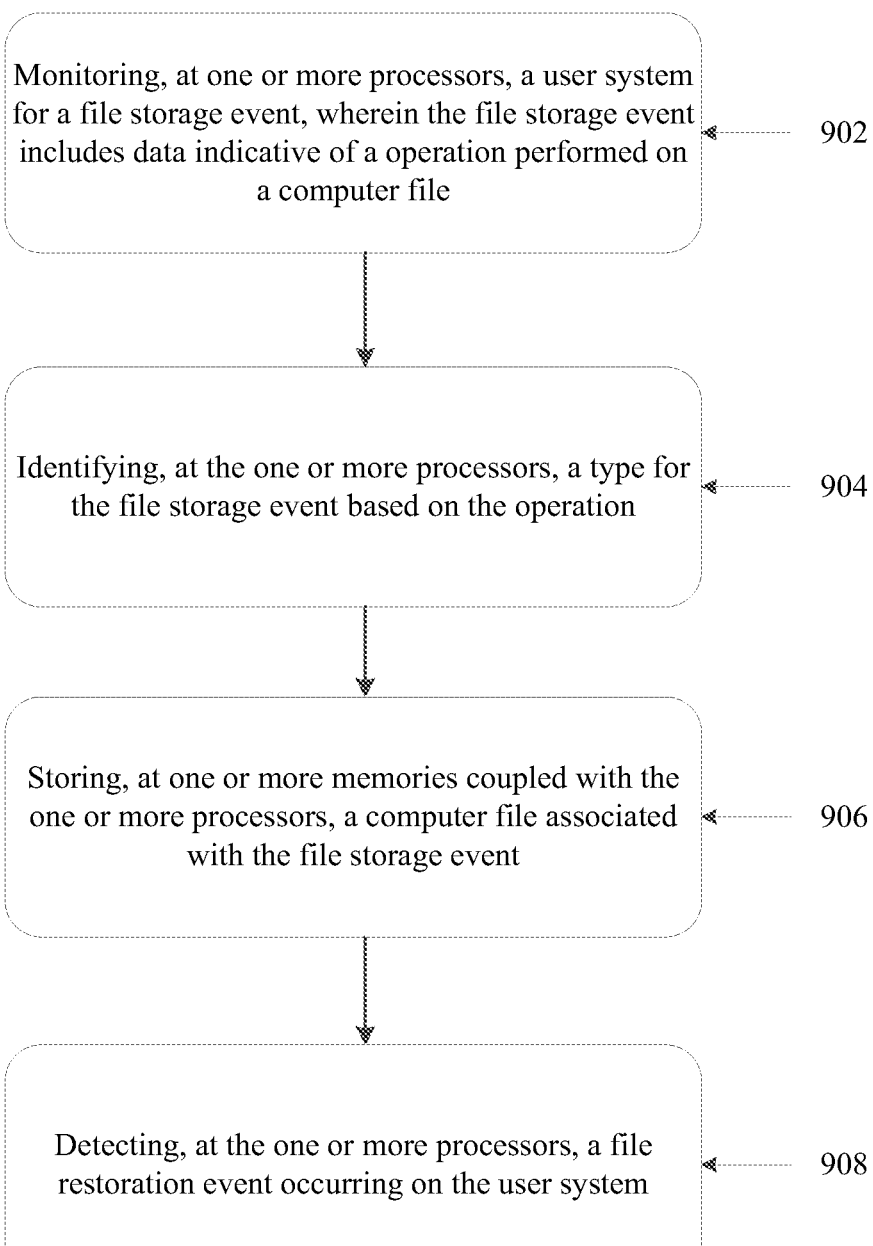

Monitoring, at one or more processors, a user system for a file storage event, wherein the file storage event includes data indicative of a operation performed on a computer file — 902

Identifying, at the one or more processors, a type for the file storage event based on the operation — 904

Storing, at one or more memories coupled with the one or more processors, a computer file associated with the file storage event — 906

Detecting, at the one or more processors, a file restoration event occurring on the user system — 908

FIG. 9

INFRASTRUCTURE METHODS AND SYSTEMS FOR EXTENDING CUSTOMER RELATIONSHIP MANAGEMENT PLATFORM

CROSS-REFERENCE TO RELATED APPLICATION

The present application claims priority to U.S. Application No. 62/671,172, filed May 14, 2018. The priority application, U.S. 62/671,172 is hereby incorporated by reference.

TECHNICAL FIELD

Systems and methods are disclosed with respect to extending customer relationship management platform, in particular, providing purpose made components to provide desired functionality.

BACKGROUND

Customer relationship management platforms are often utilized by businesses to manage their business relationship with their customers. The platforms provide an interface and system to manage the lifecycle associated with different types of customers, keep track of the number of customers a business has, analyze the needs of individual customers for a business, etc., and other relevant data for a business's customers.

Tracking, cataloging, interacting with customer data, etc., may present a variety of challenges based on the system that a user is using to access the data. Not every customer relationship management platform may provide the necessary functionality for every end user of the customer relationship management platform. In some cases there may be functionality that is missing from the customer relationship management platform. Furthermore, in some cases the manufacturer of the customer relationship management platform may not be interested in providing updates, tweaks, or changes to their customer relationship management platform.

BRIEF SUMMARY

In one aspect, a computer-implemented method for extending a customer relationship management platform may be provided. The method may include, via one or more local or remote processors, servers, sensors, and/or associated transceivers: receiving, at one or more processors, a customer data request in a multi-category format from the user system; determining, at the one or more processors, a type for the customer data request based on the multi-category format; converting, at the one or more processors, the customer data request in the multi-category format to a single category format corresponding to the customer relationship management system; and transmitting, at the one or more processors, the converted customer data request to the customer relationship management system. The method may include additional, less, or alternate actions, including those discussed elsewhere herein.

In another aspect, a computer-implemented method for controlling user browser operation may be provided. The method may include, via one or more local or remote processors, servers, sensors, and/or associated transceivers: monitoring, at one or more processors, a user system for an application start event; determining, at the one or more processors, a type of application that has been opened based on the application start event; generating, at the one or more processors, a custom cross-site scripting object based on the type of application; and transmitting, at the one or more processors, the custom cross-site scripting operation to a browser application corresponding to the application start event. The method may include additional, less, or alternate actions, including those discussed elsewhere herein.

In another aspect, a computer-implemented method for security access and control over customer data requests may be provided. The method may include, via one or more local or remote processors, servers, sensors, and/or associated transceivers: receiving, at one or more processors, a customer data request from a user, wherein the user has a dataset indicative of an agent profile; determining, at the one or more processors, a security level for the user based on the agent profile; validating, at the one or more processors, the security level for the user based on the agent profile; generating, at the one or more processors, a set of access controls for the user based on the validation; and transmitting, at the one or more processors, the customer data request augmented with the set of access controls to a customer relationship management platform. The method may include additional, less, or alternate actions, including those discussed elsewhere herein.

In another aspect, a computer-implemented method for extending file management functionality may be provided. The method may include, via one or more local or remote processors, servers, sensors, and/or associated transceivers: monitoring, at one or more processors, a user system for a file storage event, wherein the file storage event includes data indicative of a operation performed on a computer file; determining, at the one or more processors, a type for the file storage event based on the operation; storing, at one or more memories coupled with the one or more processors, a computer file associated with the file storage event; and detecting, at the one or more processors, a file restoration event occurring on the user system. The method may include additional, less, or alternate actions, including those discussed elsewhere herein.

The methods may be implemented via computer systems, and may include additional, fewer, or alternate actions or functionality. Systems or computer-readable media storing instructions for implementing all or part of the method described above may also be provided in some aspects. Systems for implementing such methods may include one or more of the following: a special-purpose computing device, a personal electronic device, a mobile device, a wearable device, a processing unit of a vehicle, a remote server, one or more sensors, one or more communication modules configured to communicate wirelessly via radio links, radio frequency links, and/or wireless communication channels, and/or one or more program memories coupled to one or more processors of the personal electronic device, processing unit of the vehicle, or remote server. Such program memories may store instructions to cause the one or more processors to implement part or all of the method described above. Additional or alternative features described herein below may be included in some aspects.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein:

FIG. 6 depicts an exemplary flow diagram for handling requests of one type and converting them to a second type associated with one aspect of the present disclosure;

FIG. 7 depicts an exemplary flow diagram for controlling browser system usage;

FIG. 9 depicts an exemplary flow diagram for file monitoring.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Systems and methods are disclosed with respect to extending customer relationship management platform, in particular, providing purpose made components to provide desired functionality. Embodiments are disclosed herein for translation multi-category data requests into single category requests; blocking or controlling browser operation; implementing security access and control over customer data requests; and file management functionality. The systems and methods may be implemented in a user system to extend the functionality of a customer relationship management platform.

The disclosed systems and methods may extend the functionality of a customer relationship management platform beyond what is offered without customization. For example, a customer relationship management platform may execute all of its functionality in what is known as a single category, or single page architecture, contrary to the plurality of software applications that leverage a multi-category architecture. This disconnect between single-page and multi-category can cause problems for both users of the underlying applications as well as current and potential customers of services that leverage the technology.

Similarly, sometimes when attempting to access a customer relationship management platform an individual may use a web browser that exposes them to vulnerabilities. These vulnerabilities may only become apparent after a web page is retrieved and loaded into a web browser. The systems and methods disclosed herein cover ways to intervene and protect users from using certain web browsers for their own safety.

Figure 1:
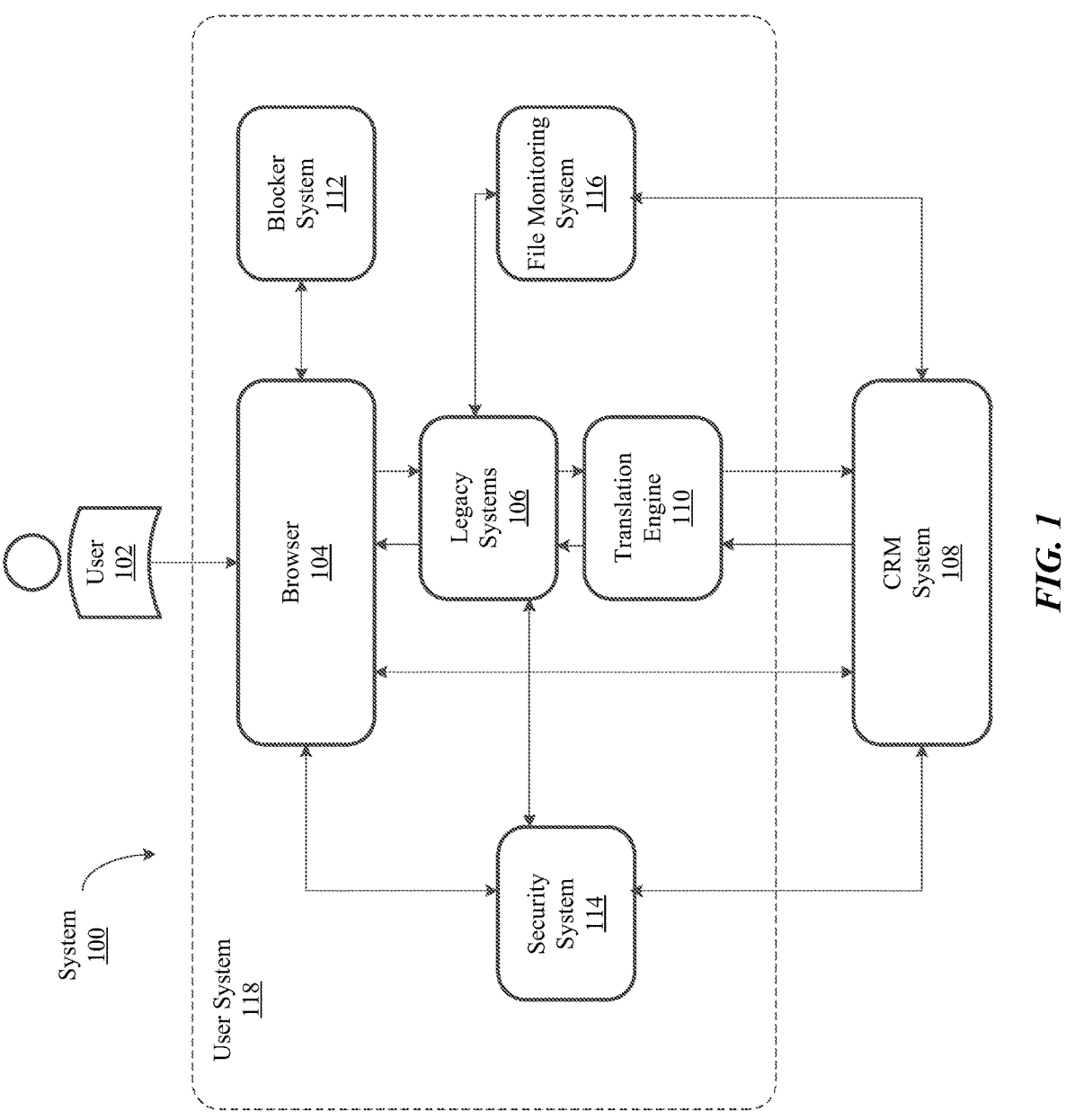
FIG. 1 depicts an exemplary system for extending customer relationship management platform, in accordance with one aspect of the present disclosure.

FIG. 1 depicts an exemplary system 100 for extending a customer relationship management platform, in accordance with one aspect of the present disclosure. The system 100 may include various components that allow a user 102 to interact with insurance customer data, such as any of the data types listed herein. The system 100 may include the user 102, a browser application 104, a set of legacy systems 106, a customer relationship management (CRM) system 108, a translation engine 110, a blocker system 112, a security system 114, and a file monitoring system 116. In some embodiments all of the components depicted in FIG. 1 may be part of the same system. In other embodiments each individual component may be located on a computer system separate from each other, such as for example, at different servers that may or may not be owned by the same individual or organization. The system 100 may include, additional, fewer, or different components from those pictured here.

In one embodiment, the browser application 104, the set of legacy systems 106, the translation engine 110, the blocker system 112, the security system 114, and the file monitoring system 116 may all be part of the same user system 118. The user system may be a single computer operated by the user 102 to interact with the CRM system 108. Alternatively, the user 102 may interact with the user system 118, but individual components depicted may be stored, and execute, on separate computers from each other component.

FIGS. 2-5 depict more detailed figures for some of the components that make up system 100 depicted in FIG. 1. In addition to the various modules depicted with additional detail in FIGS. 2-5, each component may include one or more local or remote processors, servers, sensors, and/or associated transceivers.

Figure 2:
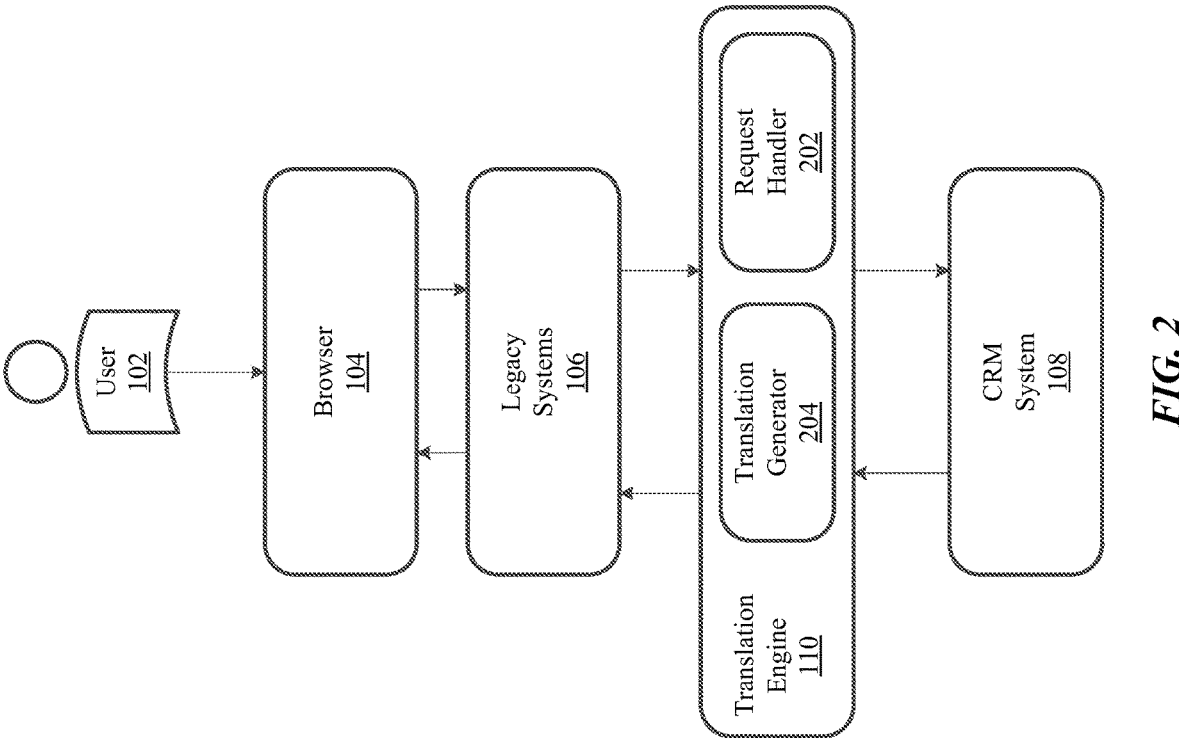
FIG. 2 depicts an exemplary translation engine for handling requests of one type and converting them to a second type, in accordance with one aspect of the present disclosure.

FIG. 2 depicts an exemplary translation engine 110 for handling requests of one type and converting them to a second type, in accordance with one aspect of the present disclosure. The translation engine may be responsible for handling requests for interacting with data, such as insurance customer data, by the user 102 that originate in legacy systems 106, and/or that originate with the CRM system 108. These data requests may be predicated on a particular software design pattern that manages the data flow, and interaction between various software programs and computer systems; however, the legacy systems 106 and the CRM system 108 may be built using a different software design pattern. Accordingly, translation between the two different design patterns allows the system to function without making changes to the legacy systems 106, and provides a benefit to the user 102. The user 102 may then continue to use the programs and systems they have grown accustomed to, and their user experience is not degraded.

In some embodiments, the translation engine 110 may include a request handler 202, a translation generator 204. The request handler 202 may be responsible for receiving, identifying, and determining if data requests that originate in legacy systems 106 need to be translated. In the event that a data request does need to be translated the translation generator 204 may generate the translation of the data request thereby providing a technical improvement to the system that allows systems that would not be able to transmit data between each other to transmit data between each other. The translation engine 110 may include, additional, fewer, or different components from those pictured here.

Figure 3:
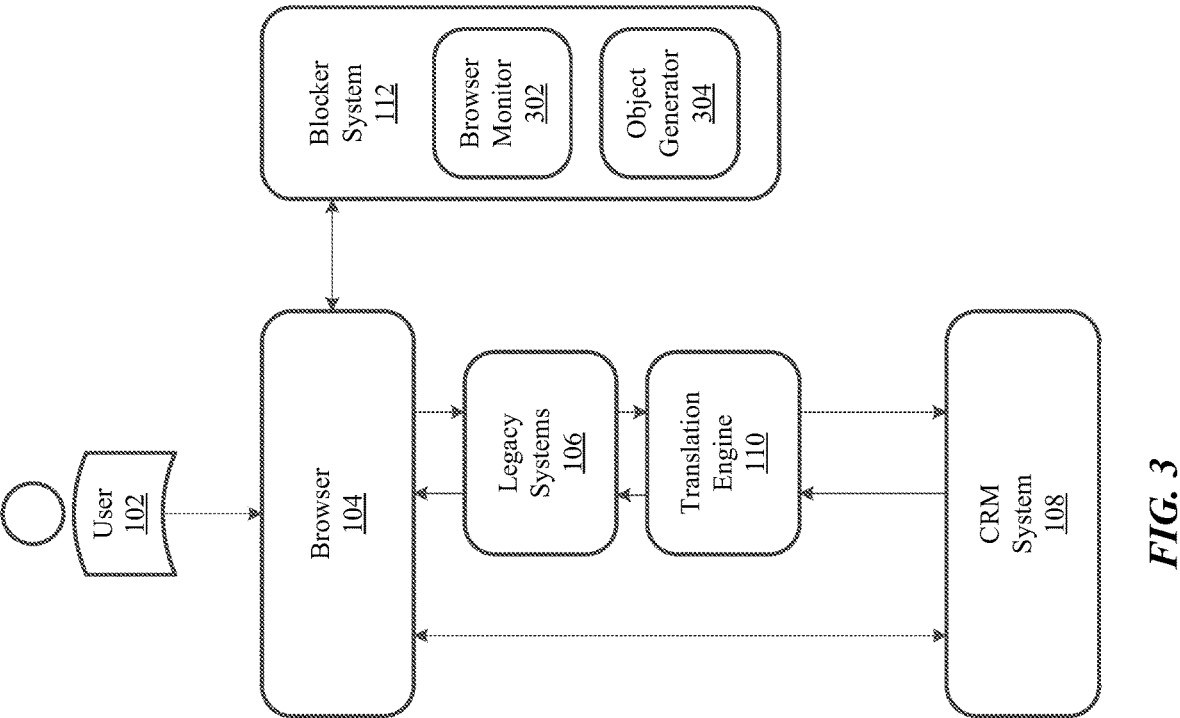
FIG. 3 depicts an exemplary blocker system for controlling browser system usage, in accordance with one aspect of the present disclosure.

FIG. 3 depicts an exemplary blocker system 112 for controlling browser system usage, in accordance with one aspect of the present disclosure. Certain browser applications may be more vulnerable to certain types of attacks than other browsers. As such, it may be beneficial to attempt to prevent a user 102 from utilizing a particular browser that is vulnerable to attacks, such as for example, cross-site scripting attacks. The blocker system 112 may include a browser monitor 302, and an object generator 304. In some embodiments, the browser monitor may monitor what software applications the user 102 is opening on their computer. When a browser application, such as browser 104, is opened the object generator 304 may attempt to generate, or instantiate, a particular type of object that can only be generated when a browser is viewing a webpage with a known type of vulnerability. In the event that the object is successfully generated it means that the user 102 is using a browser with that known vulnerability. The user 102 may be notified to switch browsers, or in some instances the browser with the vulnerability may be forced stopped by the blocker system 112. The blocker system 112 may include, additional, fewer, or different components from those pictured here.

Figure 4:
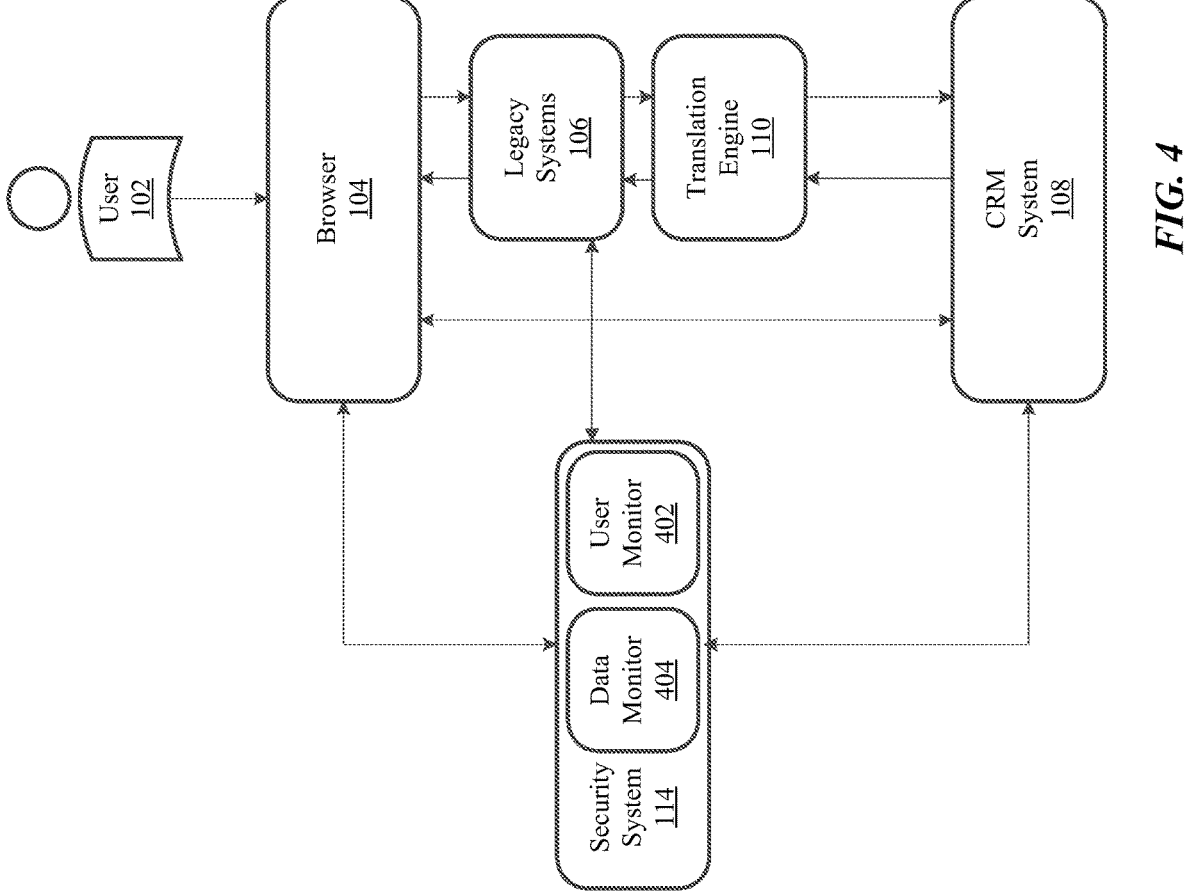
FIG. 4 depicts an exemplary security system for managing confidentiality and user access/control, in accordance with one aspect of the present disclosure.

FIG. 4 depicts an exemplary security system 114 for managing confidentiality and user access/control, in accordance with one aspect of the present disclosure. The security system 114 may include components such as a user monitor 402, and a data monitor 404. The various components may work to monitor a user 102's access, and interaction with a browser application 104, a CRM system 108, and/or a legacy system 106. The user 102 may only have authorization to view certain data that is stored by the CRM system 108. The security system 114 may monitor the user via the user monitor 402, and restrict the user's access to create, editing, deleting, and/or viewing data they are not authorized to access. Similarly, the data monitor 404 may monitor that flows through any of the components depicted in FIG. 4, and in the event that data exists a user is not authorized to access the data monitor 404 may impose access controls over that data. The security system 114 may include, additional, fewer, or different components from those pictured here.

Figure 5:
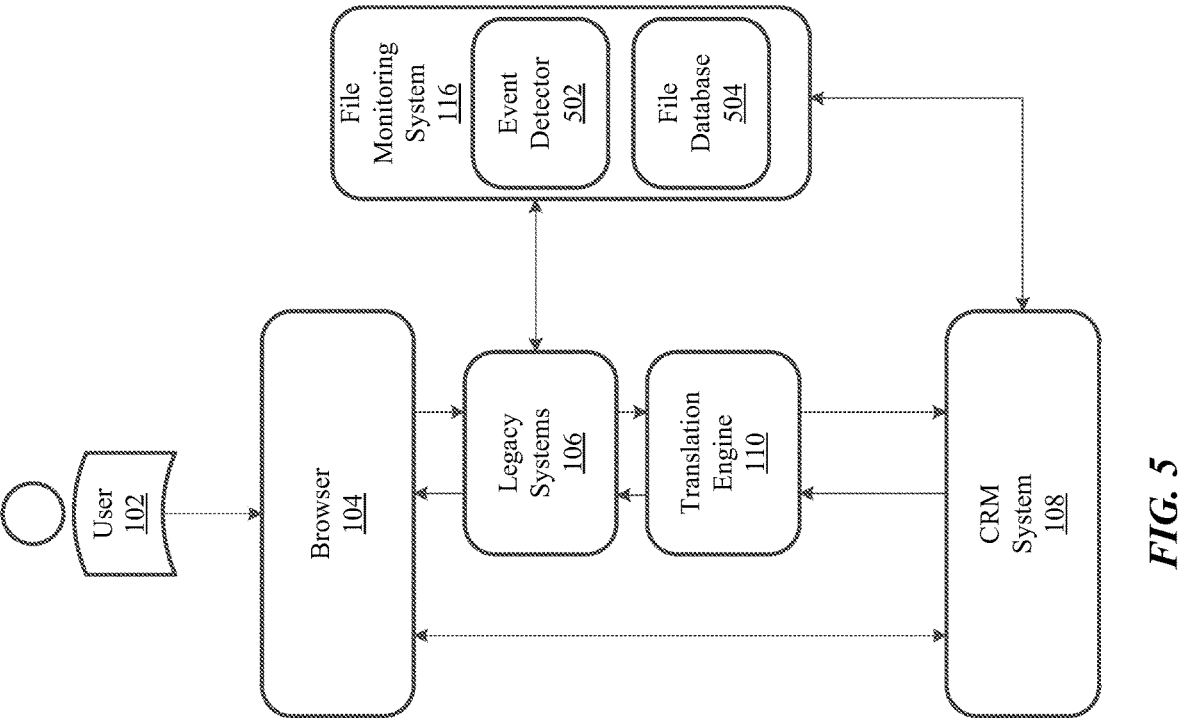
FIG. 5 depicts an exemplary file monitoring system, in accordance with one aspect of the present disclosure.

FIG. 5 depicts an exemplary file monitoring system 116, in accordance with one aspect of the present disclosure. The file monitoring system 116 may include an event detector 502, and a file database 504. In some embodiments, the user 102 deletes a computer file using a legacy system 106, or the CRM system 108, and the event detector 502 detects the file deletion. The user 102 may have accidentally deleted the file, or may later realize they did not wish to delete the file. As such, the file monitoring system 116 may store the file at the file database 504. The file database 504 may be included in the same computer system as the file monitoring system

116, or the file database 504 may be part of a cloud storage system with the result that the files may be stored in multiple, or different locations, from the rest of the file monitoring system 116. The file monitoring system 116 may include, additional, fewer, or different components from those pictured here.

Multi-Category Data Request Translation

FIG. 6 depicts an exemplary flow diagram 600 for handling requests of one type and converting them to a second type associated with one aspect of the present disclosure. The method depicted in FIG. 6 is one exemplary implementation, whereas alternative methods and systems are discussed below. In some embodiments, the method depicted may make use of systems and components depicted in FIG. 1. The steps of the computer-implemented method 600 may be performed by the systems and components depicted in FIG. 1, as well as the systems and components depicted in FIG. 2. The method 600 may include additional, fewer, or alternative actions, including those described elsewhere herein.

An exemplary method 600 for handling requests of a first type from a user system and converting them to a second type for a customer relationship management system may be disclosed. The method 600 may include receiving, at one or more processors, a customer data request in a multi-category format from the user system at block 602; identifying, at the one or more processors, a type for the customer data request based on the multi-category format at block 604; converting, at the one or more processors, the customer data request in the multi-category format to a single category format corresponding to the customer relationship management system at block 606; and transmitting, at the one or more processors, the converted customer data request to the customer relationship management system at block 608.

In some embodiments, the customer data request is a request to manipulate an insurance customer's data. For example, the request may be related to making changes to a customer's account such as updating the account, or logging an accident that the customer was involved in.

In some embodiments, the multi-category format structures data requests in a manner to be handled by a model-view-controller designed system. For example, the request may be received by a software application, or component, whose sole purpose is to interpret requests, and not to, for example, make changes to requested data, etc. A separate software application, or component, may handle interacting with the data, or data model, in such a scenario.

In some embodiments, the user system is a customer management system for an insurance agent. This customer management system may be a software application utilized by an insurance agent or insurance associate.

In other embodiments of the method, receiving the customer data request, may include transmitting, at the one or more processors, the customer data request to a translation engine. This translation engine may be a standalone software application or may be part of a user system.

In some embodiments of the method, identifying the type for the customer data request, further comprises: transmitting, at the one or more processors, the customer data request to a request handler. In other embodiments of the method, identifying the type for the customer data request, further comprises: identifying, at the one or more processors, a request to manipulate customer data stored at the customer relationship management system; and identifying, at the one or more processors, a set of subsequent operations to be taken based on the request to manipulate.

In other embodiments of the method, converting the customer data request in the multi-category format to a single category format, further comprises: generating, at the one or more processors, a single category format data request corresponding to the type for the customer data request; and augmenting, at the one or more processors, the single category format data request with a set of user data and the identified set of subsequent operations.

In other embodiments of the method, converting the customer data request in the multi-category format to a single category format, further comprises: transmitting, at the one or more processors, the customer data request to a translation generator.

In some embodiments of the method, converting the customer data request in the multi-category format to a single category format, further comprises: generating, at the one or more processors, a single category format data request corresponding to the type for the customer data request; and augmenting, at the one or more processors, the single category format data request with a set of user data and a set of requested operations from the customer data request.

Controlling User Browser Operation

FIG. 7 depicts an exemplary flow diagram for controlling browser system usage. The method depicted in FIG. 7 is one exemplary implementation, whereas alternative methods and systems are discussed below. In some embodiments, the method depicted may make use of systems and components depicted in FIG. 1. The steps of the computer-implemented method 700 may be performed by the systems and components depicted in FIG. 1, as well as the systems and components depicted in FIG. 3. The method 700 may include additional, fewer, or alternative actions, including those described elsewhere herein.

In an exemplary embodiment, a computer-implemented method 700 for controlling user browser operation is disclosed. The method 700 may include monitoring, at one or more processors, a user system for an application start event at block 702; identifying, at the one or more processors, a type of application that has been opened based on the application start event at block 706; generating, at the one or more processors, a custom cross-site scripting object based on the type of application at block 708; and transmitting, at the one or more processors, the custom cross-site scripting operation to a browser application corresponding to the application start event at block 710.

In some embodiments, the method further includes preventing, at the one or more processors, access to a customer relationship management system when the custom cross-site scripting object is successfully instantiated at a web page received at the browser application. In other embodiments, the application start event includes data indicative of a software application beginning operation.

In some embodiments of the method, identifying a type of application that has been opened, further comprises: transmitting, at the one or more processors, the application start event to a browser monitor. In other embodiments, the type of application to be identified is a browser application.

In some embodiments, the custom cross-site scripting object is a JavaScript object. Accordingly, in some embodiments, generating a custom JavaScript object, further includes transmitting, at the one or more processors, the type of application to an object generator. In some embodiments, the method further includes receiving, at the one or more processors, a cross-site scripting object from the object generator.

In some embodiments of the method, transmitting the custom cross-site scripting object to a browser application, further includes instantiating, at the one or more processors, the cross-site scripting object based on a web page received at the browser application.

Security Access and Control Over Customer Data Requests

Figure 8:
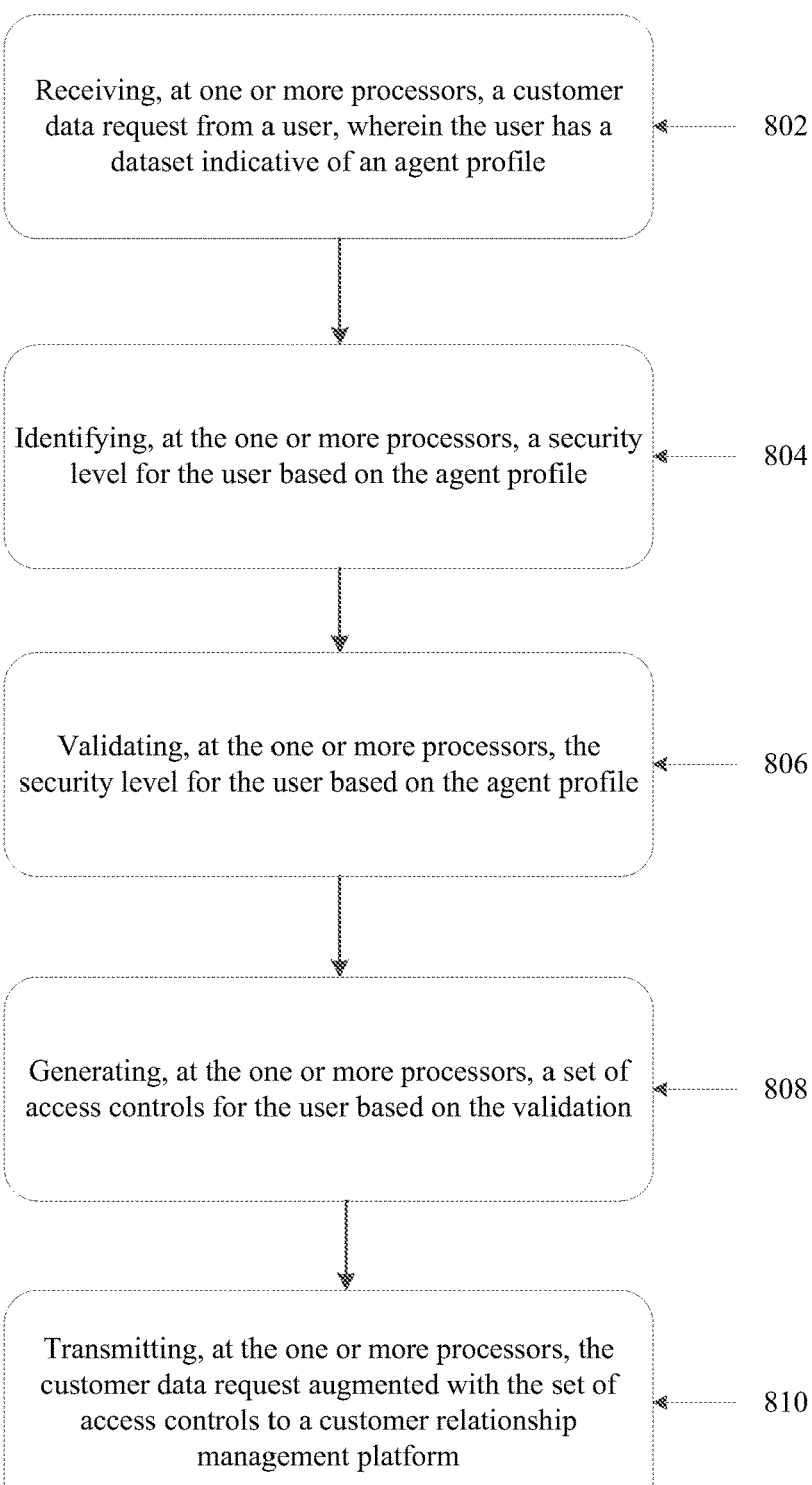
FIG. 8 depicts an exemplary flow diagram for managing confidentiality and user access/control.

FIG. 8 depicts an exemplary flow diagram for managing confidentiality and user access/control. The method depicted in FIG. 8 is one exemplary implementation, whereas alternative methods and systems are discussed below. In some embodiments, the method depicted may make use of systems and components depicted in FIG. 1. The steps of the computer-implemented method 800 may be performed by the systems and components depicted in FIG. 1, as well as the systems and components depicted in FIG. 4. The method 800 may include additional, fewer, or alternative actions, including those described elsewhere herein.

An exemplary embodiment of a method 800 for security access and control over customer data requests is disclosed. The method 800 may include receiving, at one or more processors, a customer data request from a user, wherein the user has a dataset indicative of an agent profile 802; identifying, at the one or more processors, a security level for the user based on the agent profile 804; validating, at the one or more processors, the security level for the user based on agent profile at block 806; generating, at the one or more processors, a set of access controls for the user based on the validation at block 808; and transmitting, at the one or more processors, the customer data request augmented with the set of access controls to a customer relationship management platform at block 810.

In some embodiments, the customer data request is received from a customer management system for an insurance agent. In other embodiments, the customer data request is received from a browser application running on the user system.

In some embodiments of the method, receiving the customer data request, further comprises: transmitting, at the one or more processors, the customer data request to a security system. In some embodiments of the method, receiving the customer data request, further comprises: transmitting, at the one or more processors, the customer data request to a user monitor.

In some embodiments of the method, identifying a security level for the user based on the agent profile, further comprises: receiving, at the one or more processors, an agent profile validation from a user monitor.

In some embodiments of the method, validating the security level for the user based on the agent profile, further comprises: receiving, at the one or more processors, an access profile for the user from a security system.

In some embodiments of the method, validating the security level for the user based on the agent profile, further comprises: transmitting, at the one or more processors, the customer data request to a data monitor; and receiving, at the one or more processors, an access profile for the user from the data monitor.

In some embodiments, the customer data request is augmented with the set of access controls includes data indicative of what customer data a user can see, edit, delete, and combinations thereof.

File Management Functionality

FIG. 9 depicts an exemplary flow diagram for file monitoring. The method depicted in FIG. 9 is one exemplary implementation, whereas alternative methods and systems are discussed below. In some embodiments, the method depicted may make use of systems and components depicted in FIG. 1. The steps of the computer-implemented method 900 may be performed by the systems and components depicted in FIG. 1, as well as the systems and components depicted in FIG. 5. The method 900 may include additional, fewer, or alternative actions, including those described elsewhere herein.

An exemplary method 900 for extending file management functionality is disclosed. The method 900 may include monitoring, at one or more processors, a user system for a file storage event, wherein the file storage event includes data indicative of a operation performed on a computer file at block 902; identifying, at the one or more processors, a type for the file storage event based on the operation at block 904; storing, at one or more memories coupled with the one or more processors, a computer file associated with the file storage event at block 906; and detecting, at the one or more processors, a file restoration event occurring on the user system at block 908.

In some embodiments, the method further includes restoring, at the one or more processors in conjunction with the one or more memories, the computer file based on detecting the file restoration event.

In some embodiments of the method, monitoring a user system for a file storage event, further comprises: transmitting, at the one or more processors, the file storage event to an event detector.

In some embodiments, the operation performed on the computer file is a deletion operation. In other embodiments, the operation performed on the computer file is an edit, an update, moving the file to another location, or combinations thereof.

In some embodiments of the method, storing a computer file associated with the file storage event, further comprises: transmitting, at the one or more processors, the computer file to a file database.

In some embodiments, the user system is a customer relationship management platform. In other embodiments, the user system is a customer management system for an insurance agent.

In some embodiments, the file storage event further includes data indicative of the date and time that the file operation is performed on the computer file.

In some embodiments of the method, storing a computer file associated with the file storage event, further comprises: augmenting, at the one or more processors, the computer file with data indicative of an expiration date for storing the file.

In some embodiments of the method, detecting the file restoration event, further comprises: verifying, at the one or more processors, that the expiration date associated with the computer file has not passed.

Embodiments of the techniques described in the present disclosure may include any number of the following aspects, either alone or combination:

1. A computer-implemented method for handling requests of a first type from a user system and converting them to a second type for a customer relationship management system, the method comprising: receiving, at one or more processors, a customer data request in a multi-category format from the user system; determining, at the one or more processors, a type for the customer data request based on the multi-category format; converting, at the one or more processors, the customer data request in the multi-category format to a single category format corresponding to the customer relationship management system; and transmitting, at the one or more processors, the converted customer data request to the customer relationship management system.

2. The computer-implemented method of aspect 1, wherein the customer data request is a request to manipulate an insurance customer's data.

3. The computer-implemented method of aspect 1, wherein the multi-category format structures data requests in a manner to be handled by a model-view-controller designed system.

4. The computer-implemented method of aspect 1, wherein the user system is a customer management system for an insurance agent.

5. The computer-implemented method of aspect 1, wherein receiving the customer data request, further comprises: transmitting, at the one or more processors, the customer data request to a translation engine.

6. The computer-implemented method of aspect 1, wherein determining the type for the customer data request, further comprises: transmitting, at the one or more processors, the customer data request to a request handler.

7. The computer-implemented method of aspect 1, wherein determining the type for the customer data request, further comprises: determining, at the one or more processors, a request to manipulate customer data stored at the customer relationship management system; and determining, at the one or more processors, a set of subsequent operations to be taken based on the request to manipulate.

8. The computer-implemented method of aspect 7, wherein converting the customer data request in the multi-category format to a single category format, further comprises: generating, at the one or more processors, a single category format data request corresponding to the type for the customer data request; and augmenting, at the one or more processors, the single category format data request with a set of user data and the identified set of subsequent operations.

9. The computer-implemented method of aspect 5, wherein converting the customer data request in the multi-category format to a single category format, further comprises: transmitting, at the one or more processors, the customer data request to a translation generator.

10. The computer-implemented method of aspect 1, wherein converting the customer data request in the multi-category format to a single category format, further comprises: generating, at the one or more processors, a single category format data request corresponding to the type for the customer data request; and augmenting, at the one or more processors, the single category format data request with a set of user data and a set of requested operations from the customer data request.

11. A computer-implemented method for controlling user browser operation, the method comprising: monitoring, at one or more processors, a user system for an application start event; determining, at the one or more processors, a type of application that has been opened based on the application start event; generating, at the one or more processors, a custom cross-site scripting object based on the type of application; and transmitting, at the one or more processors, the custom cross-site scripting operation to a browser application corresponding to the application start event.

12. The computer-implemented method of aspect 11, further comprising: preventing, at the one or more processors, access to a customer relationship management system when the custom cross-site scripting object is successfully instantiated at a web page received at the browser application.

13. The computer-implemented method of aspect 11, wherein the application start event includes data indicative of a software application beginning operation.

14. The computer-implemented method of aspect 11, wherein determining a type of application that has been opened, further comprises: transmitting, at the one or more processors, the application start event to a browser monitor.

15. The computer-implemented method of aspect 11, wherein the type of application to be identified is a browser application.

16. The computer-implemented method of aspect 11, wherein the custom cross-site scripting object is a JavaScript object.

17. The computer-implemented method of aspect 11, wherein generating a custom JavaScript object, further comprises: transmitting, at the one or more processors, the type of application to an object generator.

18. The computer-implemented method of aspect 16, further comprises: receiving, at the one or more processors, a cross-site scripting object from the object generator.

19. The computer-implemented method of aspect 11, wherein transmitting the custom cross-site scripting object to a browser application, further comprises: instantiating, at the one or more processors, the cross-site scripting object based on a web page received at the browser application.

20. A computer-implemented method for security access and control over customer data requests, the method comprising: receiving, at one or more processors, a customer data request from a user, wherein the user has a dataset indicative of an agent profile; determining, at the one or more processors, a security level for the user based on the agent profile; validating, at the one or more processors, the security level for the user based on the agent profile; generating, at the one or more processors, a set of access controls for the user based on the validation; and transmitting, at the one or more processors, the customer data request augmented with the set of access controls to a customer relationship management platform.

21. The computer-implemented method of aspect 20, wherein the customer data request is received from a customer management system for an insurance agent.

22. The computer-implemented method of aspect 20, wherein the customer data request is received from a browser application running on the user system.

23. The computer-implemented method of aspect 20, wherein receiving the customer data request, further comprises: transmitting, at the one or more processors, the customer data request to a security system.

24. The computer-implemented method of aspect 20, wherein receiving the customer data request, further comprises: transmitting, at the one or more processors, the customer data request to a user monitor.

25. The computer-implemented method of aspect 20, wherein determining a security level for the user based on the agent profile, further comprises: receiving, at the one or more processors, an agent profile validation from a user monitor.

26. The computer-implemented method of aspect 20, wherein validating the security level for the user based on the agent profile, further comprises: receiving, at the one or more processors, an access profile for the user from a security system.

27. The computer-implemented method of aspect 20, wherein validating the security level for the user based on the agent profile, further comprises: transmitting, at the one or more processors, the customer data request to a data monitor; and receiving, at the one or more processors, an access profile for the user from the data monitor.

28. The computer-implemented method of aspect 20, wherein the customer data request augmented with the set of access controls includes data indicative of what customer data a user can see, edit, delete, and combinations thereof.

29. A computer-implemented method for extending file management functionality, the method comprising: monitoring, at one or more processors, a user system for a file storage event, wherein the file storage event includes data indicative of a operation performed on a computer file; determining, at the one or more processors, a type for the file storage event based on the operation; storing, at one or more memories coupled with the one or more processors, a computer file associated with the file storage event; and detecting, at the one or more processors, a file restoration event occurring on the user system.

30. The computer-implemented method of aspect 29, further comprising: restoring, at the one or more processors in conjunction with the one or more memories, the computer file based on detecting the file restoration event.

31. The computer-implemented method of aspect 29, wherein monitoring a user system for a file storage event, further comprises: transmitting, at the one or more processors, the file storage event to an event detector.

32. The computer-implemented method of aspect 29, wherein the operation performed on the computer file is a deletion operation.

33. The computer-implemented method of aspect 29, wherein storing a computer file associated with the file storage event, further comprises: transmitting, at the one or more processors, the computer file to a file database.

34. The computer-implemented method of aspect 29, wherein the user system is a customer relationship management platform.

35. The computer-implemented method of aspect 29, wherein the user system is a customer management system for an insurance agent.

36. The computer-implemented method of aspect 29, wherein the file storage event further includes data indicative of the date and time that the file operation is performed on the computer file.

37. The computer-implemented method of aspect 36, wherein storing a computer file associated with the file storage event, further comprises: augmenting, at the one or more processors, the computer file with data indicative of an expiration date for storing the file.

38. The computer-implemented method of aspect 29, wherein detecting the file restoration event, further comprises: verifying, at the one or more processors, that the expiration date associated with the computer file has not passed.

Additional Considerations

This detailed description is to be construed as exemplary only and does not describe every possible embodiment, as describing every possible embodiment would be impractical, if not impossible. One may be implement numerous alternate embodiments, using either current technology or technology developed after the filing date of this application.

With the foregoing, a user may be an insurance customer who may opt-in to rewards, insurance discount, or other type of program. After the insurance customer provides their affirmative consent, an insurance provider remote server may collect data from the customer's mobile device, smart home controller, smart or autonomous vehicle, or other smart devices—such as with the customer's permission or affirmative consent. The data collected may be related to smart or autonomous vehicle functionality, smart home functionality (or home occupant preferences or preference profiles), smart or autonomous vehicle functionality, and/or insured assets before (and/or after) an insurance-related event, including those events discussed elsewhere herein. In return, risk averse insureds, vehicle owners, home owners, or home, apartment, or vehicle occupants may receive discounts or insurance cost savings related to home, renters, personal articles, auto, mobile, and other types of insurance from the insurance provider.

In one aspect, smart or autonomous vehicle data, smart or interconnected home data, and/or other data, including the types of data discussed elsewhere herein, may be collected or received by an insurance provider remote server, such as via direct or indirect wireless communication or data transmission from a smart or autonomous vehicle, smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home, apartment, or vehicle occupants.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "includes," "comprising," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for handling requests of a first type from a user system and converting them to a second type for a customer relationship management system, the method comprising:

receiving, at one or more processors, a customer data request in a multi-category format from the user system,
  wherein the customer data request: (i) includes a request to manipulate customer data stored at the customer relationship management system, and (ii) is based on a data flow software design pattern; and
  wherein the multi-category format structures data requests to be handled by a model-view-controller designed system;

determining, at the one or more processors, a type for the customer data request based on the multi-category format,
  wherein the type for the customer data request based on the multi-category format is based on a different software design pattern;

converting, at the one or more processors, the customer data request in the multi-category format to a single category format corresponding to the customer relationship management system,
  wherein the converting includes determining, via a translation engine including a request handler and a translation generator, if the customer data request needs to be translated and generating, when the customer data request needs to be translated, a translation of the data request,
  wherein converting the customer data request in the multi-category format to the single category format corresponding to the customer relationship management system does not change the user system, and
  wherein converting the customer data request in the multi-category format to the single category format corresponding to the customer relationship management system includes converting the customer data request into a single web page architecture executable by the customer relationship management system; and generating, at the one or more processors, a set of access controls for the user based on validating a security level of the user;

transmitting, at the one or more processors, the customer data request including the set of access controls to another computing system.

2. The computer-implemented method of claim 1, wherein the user system is a customer management system for an insurance agent.

3. The computer-implemented method of claim 1, wherein receiving the customer data request further comprises:

transmitting, at the one or more processors, the customer data request to the translation engine.

4. The computer-implemented method of claim 1, wherein determining the type for the customer data request further comprises:

transmitting, at the one or more processors, the customer data request to the request handler.

5. The computer-implemented method of claim 1, wherein determining the type for the customer data request further comprises:

determining, at the one or more processors, the request to manipulate customer data stored at the customer relationship management system; and determining, at the one or more processors, a set of subsequent operations to be taken based on the request to manipulate.

6. The computer-implemented method of claim 5, wherein converting the customer data request in the multi-category format to a single category format further comprises:

generating, at the one or more processors, a single category format data request corresponding to the type for the customer data request; and augmenting, at the one or more processors, the single category format data request with a set of user data and the determined set of subsequent operations.

7. The computer-implemented method of claim 3, wherein converting the customer data request in the multi-category format to a single category format further comprises:

transmitting, at the one or more processors, the customer data request to the translation generator.

8. The computer-implemented method of claim 1, wherein converting the customer data request in the multi-category format to a single category format further comprises:

generating, at the one or more processors, a single category format data request corresponding to the type for the customer data request; and augmenting, at the one or more processors, the single category format data request with a set of user data and a set of requested operations from the customer data request.

9. The computer-implemented method of claim 1, further comprising:

monitoring, at one or more processors, a user system for an application start event;

determining, at the one or more processors, a type of application that has been opened based on the application start event;

generating, at the one or more processors, a custom cross-site scripting object based on the type of application; and transmitting, at the one or more processors, the custom cross-site scripting object to a browser application corresponding to the application start event.

10. The computer-implemented method of claim 9, further comprising:

preventing, at the one or more processors, access to a customer relationship management system when the custom cross-site scripting object is successfully instantiated at a web page received at the browser application.

11. The computer-implemented method of claim 9, wherein the application start event includes data indicative of a software application beginning operation.

12. The computer-implemented method of claim 9, wherein determining a type of application that has been opened, further comprises:

transmitting, at the one or more processors, the application start event to a browser monitor.

13. The computer-implemented method of claim 9, wherein the type of application to be identified is a browser application.

14. The computer-implemented method of claim 9, wherein the custom cross-site scripting object is a JavaScript object.

15. The computer-implemented method of claim 9, wherein generating a custom JavaScript object, further comprises:

transmitting, at the one or more processors, the type of application to an object generator.

16. The computer-implemented method of claim 15, further comprising:

receiving, at the one or more processors, a cross-site scripting object from the object generator.

17. The computer-implemented method of claim 9, wherein transmitting the custom cross-site scripting object to a browser application, further comprises:

instantiating, at the one or more processors, the cross-site scripting object based on a web page received at the browser application.

18. The computer-implemented method of claim 1, further comprising:

receiving, at one or more processors, a customer data request from a user, wherein the user has a dataset indicative of an agent profile;

determining, at the one or more processors, a security level for the user based on the agent profile;

validating, at the one or more processors, the security level for the user based on the agent profile;

generating, at the one or more processors, a set of access controls for the user based on the validation; and transmitting, at the one or more processors, the customer data request augmented with the set of access controls to a customer relationship management platform.

* * * * *